United States Patent [19]

Ernst et al.

[11] 4,240,673
[45] Dec. 23, 1980

[54] LONGITUDINALLY MOVABLE ANTIFRICTION BEARING WITH FLEXURAL TONGUE

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 40,904

[22] Filed: May 21, 1979

[30] Foreign Application Priority Data

May 20, 1978 [DE] Fed. Rep. of Germany ... 7815287[U]

[51] Int. Cl.³ .............................................. F16C 29/06
[52] U.S. Cl. .................................................... 308/6 C
[58] Field of Search ............. 308/6 C, 6 A, 6 B, 6 R, 308/3 A, DIG. 11; 64/23.7

[56] References Cited

U.S. PATENT DOCUMENTS

| | | | |
|---|---|---|---|
| 3,797,897 | 3/1974 | Schaeffler | 308/6 C |
| 3,995,916 | 12/1976 | Lange | 308/6 C |
| 4,123,121 | 10/1978 | Ernst et al. | 308/6 C |

Primary Examiner—Lenard A. Footland
Attorney, Agent, or Firm—Daniel M. Rosen

[57] ABSTRACT

In a longitudinally moveable antifriction bearing having an endless row of rolling elements, with a zone for loaded rolling elements, a return zone for unloaded rolling elements and reversing sections joining the respective loaded zones and return zones, flexurally elastic tongues are provided for directing the rolling elements onto and away from the loaded zone.

15 Claims, 6 Drawing Figures

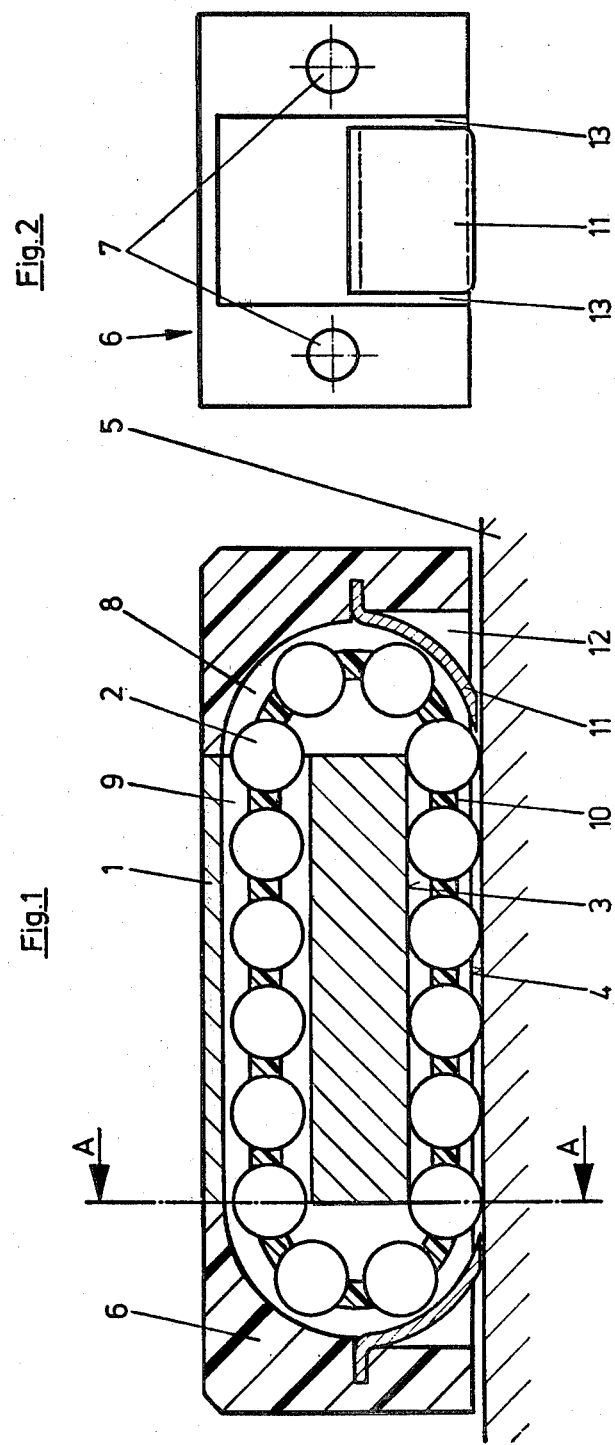

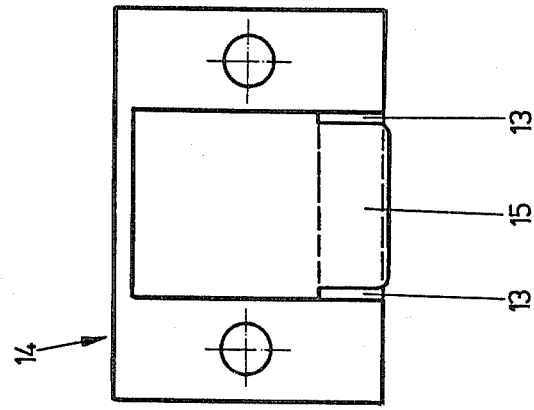
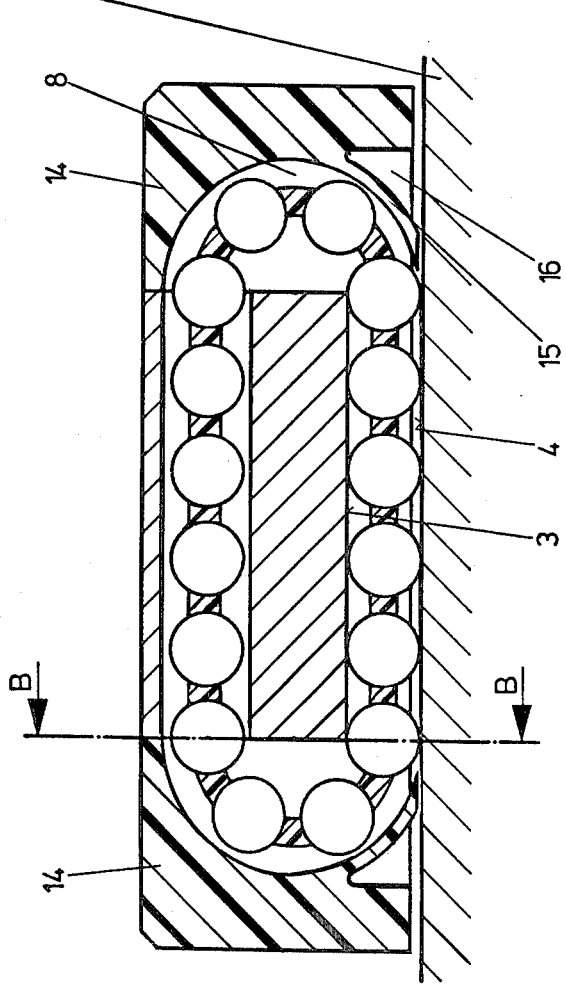

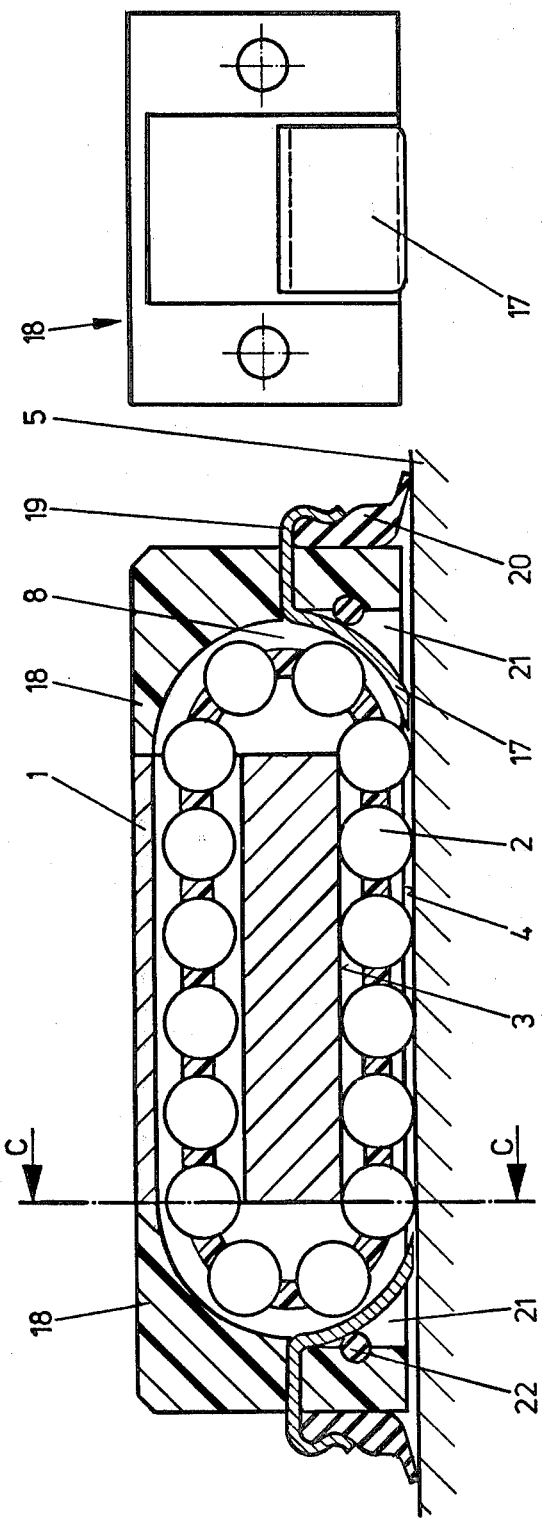

LONGITUDINALLY MOVABLE ANTIFRICTION BEARING WITH FLEXURAL TONGUE

BACKGROUND OF THE INVENTION

This invention relates to an antifriction bearing for supporting machine elements so as to be longitudinally moveable, and including at least one endless row of rolling elements. Each rolling-element row is arranged so that the rolling elements enter and leave a load zone between a race of the guide block and a race of the associated machine element. The direction of travel of the elements is reversed in the reversing tracks of end sections disposed at both the entry and exit ends of the load zone, the rolling elements are returned in a return track interconnecting the reversing tracks of the two end sections.

In a known antifriction bearing of this type, the end sections are made of an elastic plastic in order that the rolling elements may enter and leave the reversing track of the end sections without jolts. This jolting results in undesirable rapid wear in use, since the entry and exit edges of the reversing track necessarily consist of a relatively soft and delicate plastic. As a result, play develops between the load zone and the entry or exit edge of the reversing tracks even after a short period of use, and this play impairs the precise guidance of the rolling elements and may lead to deleterious jamming and skewing of the rolling elements in the bearing. In addition, due to the inadequate guidance of the rolling elements in the area between the load zone and the entry or exit edge of the reversing tracks, undesired entering and leaving jolts occur which produce objectionable running noise.

Another antifriction bearing of this type is known in which the end sections are made of wear-resistant steel. In this case the rolling elements are guided along relatively hard, unyielding edges and walls of the reversing track so that the rolling elements enter and leave the reversing track of the end section with a jolt and the antifriction bearing is noisy in operation. Moreover, the reversing track and the rolling elements are damaged by the resultant severe undamped impact and guidance shocks in the reversing track.

The present invention is therefore directed to the provision of an improved antifriction bearing of the type mentioned above in which the rolling elements enter and leave and are guided in the reversing track smoothly and without jolts, and in which the rolling elements are at the same time guided in the reversing track in such a way that there is no wear. In addition, the antifriction bearing of the invention can be manufactured economically.

SUMMARY OF THE INVENTION

Briefly stated, in accordance with the invention, the rolling elements are guided from the load zone into the particular reversing track, or from the reversing track into the load zone, smoothly and without jolts by means of flexurally elastic tongues depending from the end sections, so that the bearing is noiseless in operation. The flexurally elastic tongues may advantgeously be made of a hard, wear-resistant material which will show no wear even after prolonged use of the antifriction bearing.

In order to enable the tongues to be particularly easy to manufacture they may, for example, be produced by a punching or stamping operation.

It is also possible to produce the end sections economically from a plastic incorporating wear-reducing solid lubricants, and to make the tongues of a sheet-steel having high abrasion resistance.

In accordance with the invention, the antifriction bearing has an end section consisting of few components, and is readily producible by plastic injection-molding.

In a modification of the invention, the end section comprises a tongue which secures a gasket to the outer face of the end section in a simple manner. The gasket may be securely held and clamped by the elastic tongue.

In addition, a lubricant-containing chamber may be provided which accommodates a supply of lubricant for lubrication of the rolling elements of the antifriction bearing. The lubricant is able to pass from the chamber to the rolling elements by flowing between the tongue and the wall of the end section to the reversing track. The flexurally-elastic displacements of the tongue occuring in operation are of especial advantage in this regard, since the volume of the chamber is varied and consequently some lubricant is continuously pumped from the chamber past the tongue and onto the reversing track. The rolling elements are thus automatically lubricated, especially at the entry and exit ends of the load zone where they strike the entry or exit edge, respectively, of the reversing zone. Wear, to which the entry or exit edge might be subject due to lack of lubrication, is thus eliminated.

In a modification of the invention the flexurally elastic vibrations of the tongue are advantageously damped by shock-absorbing material so that the antifriction bearing operates noiselessly.

In order that the invention will be more clearly understood, it will now be disclosed in greater detail with reference to accompanying drawings, wherein:

BRIEF DESCRIPTION OF THE DRAWINGS

FIG. 1 is a longitudinal section through an antifriction bearing in accordance with the invention;

FIG. 2 is a side elevation of an end section, taken along the line A—A in FIG. 1;

FIG. 3 is a longitudinal section through a modified antifriction bearing;

FIG. 4 is a side elevation of an end section, taken along the line B—B in FIG. 3;

FIG. 5 is a longitudinal section through a further modified antifriction bearing; and FIG. 6 is a side elevation of an end section, taken along the line C—C in FIG. 5.

DESCRIPTION OF THE PREFERRED EMBODIMENTS

Referring now to the drawings, and more in particular to FIG. 1, therein is illustrated, in simplified form, a longitudinal bearing comprising a guide block 1 having generally parallel channels 1a and 1b defining a load zone and a return zone respectively. End sections 6 are affixed to the ends of the guide block 1 by conventional means, such as screws or the like, for example extending into screw holes 7 such as illustrated in the end view of FIG. 2. The end sections 6 have reversing tracks 8 formed therein, for reversing the directions of movement of an endless row of cylindrical rolling elements 2 in the loaded and return zones of the bearing. In the loaded zone 1a the guide block 1 is provided with an axially extending opening so that the rolling elements 2 may engage a machine element 5 adapted to be longitudinally moveable with respect to the guide block. Further, in the load zone 1a the load carrying rolling elements 2 roll between the race 3 of the guide block and the race 4 of the machine element 5. The structure thereby forms a complete, symmetrical antifriction bearing.

In the arrangement of FIGS. 1 and 2, the end sections 6 may be made of a plastic material, as indicated, and this plastic material may include a solid lubricant such as molybdenum disulfide.

The reversing tracks 8 of the end sections 6, which may be machined in the end sections 6, thus join the loaded zones and return zones at the respective ends of the guide block 1.

Thus, reversing track 8 empties at one of its ends into the load zone between the races 3 and 4 and at its opposite end into the return track 9 of the guide block 1. In the reversing track 8, the rolling elements 2 of the end section 6 disposed at the entry or exit end, respectively, of the load zone are reversed, and in the longitudinally extending return track 9, which connects the reversing tracks 8 of the two end sections 6 to each other, the rolling elements 2 are returned.

An endless elastic tapelike spacer 10 with cage pockets for the rolling elements 2 is provided for keeping the rolling elements 2 of the row spaced from one another at all times.

Each of the two end sections 6 further comprises a tongue 11 having bending elasticity, preferably punched from sheet steel. The end of the tongue pointing away from the guide block 1 (i.e. axially outwardly in the bearing) is molded into the plastic end section 6 or is fixed to the end section by ultrasonic welding. The tongue 11 is constructed as a part of the respective reversing track 8 and is disposed in the immediate vicinity of the entry or exit end, respectively, of the load zone.

At the end section 6 disposed at the exit end of the load zone of the guide block 1, (considering a given direction of relative movement of the guide block 1) the load zone, lifts it up from the race 4 of the longitudinally moveable machine element 5, and introduces it into the reversing track 8. Impact shock is absorbed and damped by the flexurally elastic tongue 11, which at its outer end is capable of being elastically deflected. Disposed on the opposite side of the guide block 1 is the associated other end section 6 at the entry end of the load zone. The tongue 11 of this other end section 6 is located in direct proximity to the entry end of the load zone and guides the rolling elements 2 coming from the reversing track 8 free of jolts into the space between the races 3 and 4.

Between the tongue 11 and the associated end section 6, a chamber 12 is provided for accommodation and storage of lubricant (grease) for the antifriction bearing. The flexurally elastic deflections of the tongue 11 in operation produce pressure fluctuations in that chamber, and these will pump lubricant through the gap 13 between the sides of the tongue and the end sections 6 past the tongue 11, and into the reversing track 8 so that lubricant is automatically fed to the rolling elements 2. Wear due to lack of lubricant is thereby prevented in the bearing.

FIGS. 3 and 4 show a modified antifriction bearing for supporting a machine element 5 to be relatively longitudinally moveable with respect to the guide block. This bearing is constructed like the one illustrated in FIGS. 1 and 2, described above, but comprises two end sections 14 whose flexurally elastic tongues 15 are intergral with the end sections and of the same material. The end sections 14 are thus formed of plastic by the injection-molding process at the same time as the end sections. As in the previously described case, the rolling elements 2 here are guided by the flexurally elastic tongue 15 of the respective end section 14 free of jolts from the load zone, located between the races 3 and 4, into the reversing track 8, or from the reversing track 8 into the load zone. The tongue 15 is preferably made of a relatively hard, wear-resistant plastic.

Between the tongue 15 and the outer portion of the end section 14, a chamber 16 is provided which is filled with lubricating grease. From this chamber 16, the rolling elements 2 are again supplied automatically and continuously with fresh grease which is pumped by means of the flexurally elastic deflections of the tongue 15 through the gap 13 into the reversing track 8.

FIGS. 5 and 6 show a further modified antifriction bearing in which the flexurally elastic tongue 17 is made of sheet steel and is disposed so as to extend through the associated plastic end section 18. The end 19 of the tongues directed away from the guide block 1 carry a gasket 20 shaped to slide on the longitudinally moveable machine element 5. The end 19 of the tongue 17 extends around the gasket 20 at least one side of the gasket to the respective end section 18.

The other end of the tongue 17 is directed toward the load zone between the races 3 and 4 in the above discussed manner, forms a part of the respective reversing track.

Between the tongue 17 and the associated end section 18, a chamber 21 is provided for accommodation of a lubricant for the rolling elements 2. Chamber 21 also holds an elastic member 22 having a round cross section and made of rubber, for example, which advantageously damps the flexurally elastic vibrations of the tongue 17.

In operation, the flexurally elastic tongue 17 is elastically deflected by the rolling elements striking it, with the result that pressure fluctuations are produced in chamber 21 and lubricant is pumped from chamber 21 into the reversing track 8. The gasket 20 serves to prevent lubricant from being pumped outwardly from chamber 21, and dirt particles from penetrating from the surroundings into the interior of the antifriction bearing.

The antifriction bearing for supporting machine elements so as to be longitudinally moveable, as described above, may be substantially modified within the scope of the invention. For example, the rolling elements need not be cylindrical but may have any desired form and may, for example, be spherical. In this case the cross sections of the reversing and return tracks are appropriately adapted to the form of the rolling elements. The antifriction bearing may be provided with a plurality of rows of rolling elements. The spacer of each rolling-element row need not be tapelike but may be formed by elastic cage segments arranged in a row. The rolling elements of the rolling-element rows may also be mounted without a separator, in a "full-roller" or "full-ball" arrangement. Thus, any conventional techniques may be employed for spacing the rolling elements.

Further, while the illustrated embodiments of the invention generally show the load and return zones as being vertically aligned, with respect to the machine element 5, it will be apparent that, particularly when the rolling elements are spherical, this orientation is not specifically necessary. It is consequently intended in the following claims to cover each such variation and modification as falls within the true spirit and scope of the invention.

What is claimed is:

1. In an antifriction bearing for longitudinal movement with respect to a machine element, comprising a guide block having a guide for guiding an endless row of rolling elements, the guide defining a load zone enabling the rolling elements to move between a race on the machine element and a race on the guide block, a return zone for rolling elements not under load, and a pair of end sections having reversing races joining the return zone and load zone at the respective ends thereof; the improvement wherein each said end section comprises a flexurally elastic tongue directed toward the respective ends of the load zone and forming a part of said reversing race, said tongues being mounted adjacent the respective ends of the load zone and positioned to lift rolling elements from said loading zone and direct them in respective reversing race.

2. The antifriction bearing of claim 1 wherein said tongues are made of sheet steel.

3. The antifriction bearing of claim 2 wherein each of said end sections is of a plastic material, said sheet steel tongues being secured therein by ultrasonic welding.

4. The antifriction bearing of claim 1 wherein said tongues are integral with the respective end sections.

5. The antifriction bearing of claim 1 wherein said tongues extend axially through and beyond the respective end sections, further comprising gasket means held to said end sections by the ends of said tongues extending through said end sections.

6. The antifriction bearing of claim 5 wherein said portions of said tongues extending axially beyond said end sections are bent to extend around the respective said gaskets.

7. The antifriction bearing of claim 1 wherein a chamber for holding lubricant is positioned in each said end section on the side of the respective tongue away from the reversing race.

8. The antifriction bearing of claim 1 wherein a a shock absorbing material is provided in said end sections on the side of the respective tongue away from the reversing race.

9. The antifriction bearing of claim 8 wherein said shock absorbing material is rubber.

10. The antifriction bearing of claim 1 wherein said rolling elements are cylindrical rollers, said reversing races are semicircular, and said load zone and return zone are straight and parallel to one another.

11. The antifriction bearing of claim 1 wherein said tongues are arcuate and extend substantially 90°.

12. The antifriction bearing of claim 1 wherein said tongues are arcuate and are unsupported adjacent said load zone for a substantial arc.

13. The antifriction bearing of claim 1 wherein said rolling elements are spherical.

14. The antifriction bearing of claim 1 wherein said return zone is aligned with the race on said machine element for guiding loading rolling elements.

15. The antifriction bearing of claim 1 wherein said end sections are removably affixed to said guide block.

* * * * *

UNITED STATES PATENT AND TRADEMARK OFFICE
CERTIFICATE OF CORRECTION

PATENT NO. : 4,240,673

DATED : December 23, 1980

INVENTOR(S) : Horst M. Ernst, et al

It is certified that error appears in the above—identified patent and that said Letters Patent is hereby corrected as shown below:

Column 3, line 44, change "load zone, lifts it" to -- tongue 11 lifts the rolling element --.

Column 6, line 11, omit "a" second occurrence.

Signed and Sealed this

Twenty-ninth Day of September 1981

[SEAL]

Attest:

GERALD J. MOSSINGHOFF

Attesting Officer

Commissioner of Patents and Trademarks